United States Patent [19]

Eckle

[11] 4,286,901
[45] Sep. 1, 1981

[54] CLAMPING DEVICE FOR CLAMPING A TURNABLE CUTTER BLADE ON A TOOL HOLDER

[75] Inventor: Otto Eckle, Loechgau, Fed. Rep. of Germany

[73] Assignee: Komet Stahlhalter- und Werkzeugfabrik Robert Breuning GmbH, Besigheim, Fed. Rep. of Germany

[21] Appl. No.: 85,176

[22] Filed: Oct. 15, 1979

[30] Foreign Application Priority Data

Oct. 27, 1978 [DE] Fed. Rep. of Germany ... 7831988[U]

[51] Int. Cl.³ .............................................. B23P 15/30
[52] U.S. Cl. ...................................... 407/109; 407/47; 407/111
[58] Field of Search ............... 407/107, 109, 110, 111, 407/112, 113, 101, 102, 46, 47

[56] References Cited

U.S. PATENT DOCUMENTS

| | | | |
|---|---|---|---|
| 2,897,580 | 8/1959 | Huber | 407/109 |
| 3,156,031 | 11/1964 | Lundgren | 407/109 |
| 3,171,188 | 3/1965 | Stier | 407/101 |
| 3,175,276 | 3/1965 | Weber et al. | 407/46 |
| 3,246,382 | 4/1966 | Zierden | 407/112 |

*Primary Examiner*—Leonidas Vlachos
*Attorney, Agent, or Firm*—Blanchard, Flynn, Thiel, Boutell & Tanis

[57] ABSTRACT

For clamping a turnable cutter blade on a tool holder a clamping jaw is provided which has a two-arm lever construction. The clamping jaw has in its center part a substantially cylindrical projection. This projection engages a cylindrical recess of the tool holder. A locking screw extends through an opening in the center part and in the projection of the clamping jaw and is threadedly received in an internally threaded opening of the tool holder. The locking screw urges the clamping jaw into clamping engagement with the cutter blade.

14 Claims, 2 Drawing Figures

U.S. Patent    Sep. 1, 1981    4,286,901
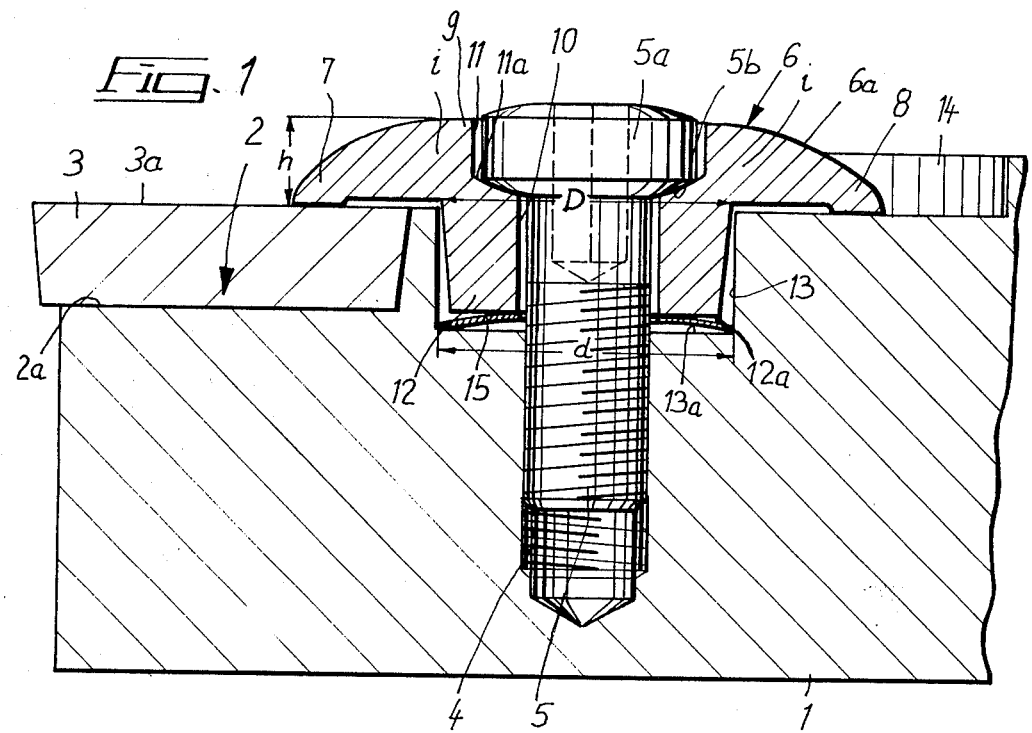
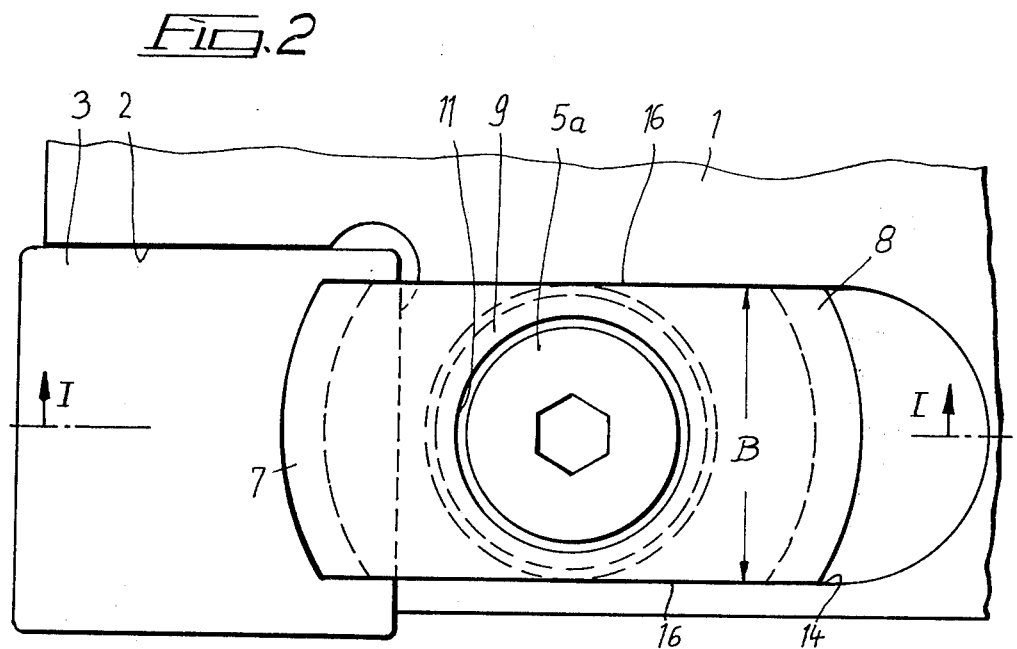

CLAMPING DEVICE FOR CLAMPING A TURNABLE CUTTER BLADE ON A TOOL HOLDER

FIELD OF THE INVENTION

The invention relates to a clamping device for clamping a turnable cutter blade on a tool holder, which clamping device includes a clamping jaw which has a two-arm lever construction, of which the front lever arm is supported on the upper surface of the turnable cutter blade and presses same against its support surface on the tool holder and of which the rear lever arm is supported in a centering recess of the tool holder, and a locking screw, which extends through an opening in the center part of the clamping jaw, which part lies between both lever arms, and is screwed into an internally threaded opening in the tool holder.

BACKGROUND OF THE INVENTION

In clamping devices of this type, the clamping jaw is stressed for bending in its center part which is weakened by the provision of the opening for the locking screw. In order to lend said clamping jaw the necessary bending stiffness, it must be constructed particularly high or thick in the center part or, however, also very wide. At any rate, such a bulky construction of the clamping jaw forms an obstacle for the discharging chips which are formed during the machining process. This is primarily annoying during an internal working, where the chip has only a limited area for its discharge. Random and irregularly formed chips are created in the openings through the clamping jaw, which occupy the entire free space and often cause considerable breakdowns, such as blade breakage and the forcing away of the drill rod by wedged-in chip balls, diameter deviations and roughed-up or rather damaged surfaces. If one forms such clamping jaws with small dimensions in the center part, then they do not have the necessary clamping force generating capabilities.

The basic purpose of the invention is to provide a clamping device of the above-mentioned type in which the clamping jaw projects as little as possible above the chip surface and thus assures a good chip discharge, wherein the clamping jaw, however, also assures a good clamping with a high amount of clamping power. In a further embodiment of the invention, the clamping device is also inexpensive to manufacture and has improved handling capabilities.

The basic purpose of the invention is attained by the clamping jaw having in its center part on its side facing the turnable cutter blade a substantially cylindrical projection which is arranged coaxially with respect to the opening, and in which is continued the opening for the locking screw, and that in the tool holder there is provided a cylindrical recess which is arranged coaxially with respect to an internally threaded opening therein, and in which recess is received the projection of the clamping jaw.

Through this embodiment it is achieved that the clamping jaw has a high resistance to bending and simultaneously projects little beyond the chip surface of the turnable cutter blade. The projection which is provided on the underside of the clamping jaw namely increases the bending stiffness of the center part very substantially. Since, however, the projection on the underside of the clamping jaw projects into the tool holder, it does not at all interfere with the chip discharge. The clamping jaw can be kept extremely flat.

Furthermore, it is preferable if the opening in the center part of the clamping jaw on the upper side of the same has an enlarged section for the complete reception of the screwhead. In this manner, it is assured also that no chips can get caught on the screwhead.

The bottom wall of this enlarged segment preferably has a ball-cup-shaped construction and the pressure surface of the screwhead, which surface faces the bottomwall, has a segment of a sphere shape. In this manner, it is possible with possible height variations between the upper side of the turnable cutter blade and the support surface for the rear lever arm on the tool holder to adjust the clamping jaw to the respective conditions and still have the screwhead rest with its entire periphery on the clamping jaw.

The projection is preferably tapered slightly toward its free end and has a frustum of a cone shape, wherein the angle of the cone is approximately 10° or less. Through this frustum-shaped construction, the clamping jaw is centered with respect to the cylindrical receiving opening, even when said opening is not completely occupied. Thus, it is assured that the clamping jaw rests always on the predetermined point of the upper side of the turnable cutter blade.

The clamping jaw has furthermore preferably two equally long lever arms and is constructed as a rotationally symmetrical swivel part, which has two lateral flattened edge portions which extend parallel with respect to the longitudinal axis of the lever arms and parallel to one another, and which extend approximately tangentially with respect to the surface of the projection. Through this embodiment, the clamping jaw can be manufactured inexpensively as a swivel part. The lateral flattened edge portions can be manufactured by milling in a simple manner.

BRIEF DESCRIPTION OF THE DRAWING

The invention is discussed in greater detail hereinbelow with reference to an exemplary embodiment which is illustrated in the drawing, in which:

FIG. 1 is a central cross-sectional view of the clamping device taken along the line I—I of FIG. 2; and FIG. 2 is a top view of the same.

DETAILED DESCRIPTION

Reference numeral 1 identifies a tool holder in the drawing; in the present case, the tool holder of a lathe tool. However, the clamping device can be used on any other desired tool for tool machines, for example, also on a boring bar or on a special tool. A recess 2 with a support surface 2a is provided in the tool holder for receiving therein a turnable hard metal cutter blade 3. Aside from this recess, the tool holder 1 has an internally threaded opening 4 which extends substantially perpendicularly with respect to the plane of the support surface 2a of the tool holder 1. An externally threaded locking screw 5 is threadedly received in the internally threaded opening 4. The locking screw 5 serves to hold a clamping jaw 6 which has a two-arm lever configuration, particularly a front lever arm 7 and a rear lever arm 8. The clamping jaw 6 has in its center part 9 between both lever arms an opening 10 for passage of the locking screw 5 therethrough. In order for the enlarged screwhead 5a of the locking screw 5 to project as little as possible above the upper surface 6a of the clamping jaw 6, the opening 10 has an enlarged section 11 for the complete reception of the screwhead 5a therein. The bottom wall 11a of the enlarged section is preferably constructed in a ball-cup-shape and the bottom pressure surface 5b of the screwhead 5a, which surface faces the bottom wall 11a, has the shape of a segment of a sphere.

The clamping jaw 6 has on its side which faces the cutter blade 3, a projection 12 which is arranged coaxially and coextensively with respect to the opening 10 and is substantially cylindrical in shape. A cylindrical recess 13 is provided in the tool holder 1 and the internally threaded opening 4 is located in the center of the recess 13. The projection 12 is received in the recess 13 in the clamping jaw 6 and the hole 4 and opening 10 are axially aligned so that the locking screw can be effectively engaged with the tool holder 1. The projection 12 very substantially reinforces the clamping jaw in the center part 9; the clamping jaw 6 projects only with a small structural height h above the upper surface 3a of the clamping jaw. It has, in spite of this, a high bending moment and thus also a high clamping force.

In the illustrated exemplary embodiment, the projection 12 tapers slightly toward its free end and has, therefore a frustum of a cone shape. The angle of the cone is approximately 10°. The largest diameter D of the conical projection 12 corresponds approximately with the diameter d of the cylindrical recess 13. The clamping jaw 6 is centered relative to the tool holder 1 through this structure.

In order to secure it also against rotation, the rear lever arm 8 is received in a slot or groove 14 in the tool holder 1 and the width of the groove corresponds approximately with the width B of the rear lever arm 8.

A cup spring 15 or a similar spring arrangement is preferably also provided in the cylindrical recess 13 between the base or bottom wall 13a thereof and the free end of the projection 12. During a loosening of the locking screw 5, the cup spring 15 presses or urges the clamping jaw 6 upwardly to cause it to be lifted upwardly from the upper surface 3a of the turnable cutter blade 3. As a result of this feature, a changing of the cutter blade 3 or turning same is made easier.

The new clamping device is built not only very flat and thus hinders the chip discharge only little, but it takes up also as a whole only little space and can be easily positioned also in the case of tight or small space conditions.

The cross sections of the two lever arms 7 and 8 are held preferably in the area i between their support surfaces on the turnable cutter blade 3 or in the groove 14 and the center part 9, so that during a tightening of the locking screw 5, a springy initial tension is created. This assures that the locking screw 5 is exposed at all times to a similar initial tension and thus can also not open or be unscrewed automatically during operation. The clamping jaw thus acts simultaneously as a springy or resilient locking washer.

The clamping jaw is preferably constructed as a rotationally symmetrical swivel part and has two equally long lever arms 7 and 8. However, in order to keep the clamping jaw 6 as narrow as possible, it has, as can be seen from FIG. 2, two flattened lateral edge portions 16 which extend parallel to one another and parallel to the longitudinal axis of the lever arms 7, 8 and approximately tangentially with respect to the surface 12b of the projection. Such a swivel part with two flattened edge portions, which can be manufactured by milling, is extremely inexpensive to manufacture.

If it is desired, the rear lever arm 8 can also be constructed shorter than the front lever arm 7. Also in this case it is possible to manufacture the clamping jaw as a swivel part, wherein then, of course, the opening 10, the enlarged section 11 and the projection 12 are arranged eccentrically with respect to the outer arc-shaped limiting surfaces of the lever arms 7,8.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. In a clamping device for clamping a turnable cutter blade on a tool holder with a clamping jaw which has the construction of a two-arm lever, of which a front lever arm is supported on an upper side of said turnable cutter blade and presses same against a support surface on said tool holder and of which a rear lever arm is supported in a centering recess in said tool holder, said clamping jaw having a center part with means defining a hole extending therethrough, and a locking screw extending through said hole in said center part of said clamping jaw, said center part being located between said front and rear lever arms and is screwed into an internally threaded opening in said tool holder, the improvement comprising wherein said clamping jaw has on said center part a projection which is arranged coaxially with respect to the internally threaded opening, said projection having an opening therethrough for said locking screw, wherein a recess which is arranged coaxially with respect to said internally threaded opening is provided in said tool holder, into which recess is received said projection of said clamping jaw, wherein the exterior surface of said projection whose cross section at any point along its length is a circle, and wherein said front and rear lever arms are equally long and said clamping jaw is constructed as a rotationally symmetrical swivel part having two lateral flattened edge portions which extend parallel to the longitudinal axis of said front and rear lever arms and parallel to one another, and which flattened edge portions extend approximately tangentially with respect to said exterior surface of said projection.

2. The device according to claim 1, wherein said hole has in the center part of said clamping jaw on the upper side thereof an enlarged section for the complete reception of a screwhead on said locking screw therein.

3. The device according to claim 2, wherein the bottom wall of said enlarged section has a ball-cup-shape and the pressure surface of said screwhead, which surface faces said bottom wall, has the shape of a sphere.

4. The device according to claim 1, wherein said projection is tapered toward its free end and has a frustum of a cone shape and wherein the angle of the cone is approximately 10°.

5. The device according to claim 4, wherein said recess into which is received said projection is cylindrical and wherein the largest diameter of said projection corresponds approximately with the diameter of said cylindrical recess.

6. The device according to claim 1, wherein a cup spring is arranged in said recess between the bottom wall thereof and the free end of said projection.

7. The device according to claim 1, wherein a groove is provided in said tool holder for receiving said rear lever arm therein, the width of which groove corresponds with the width of said rear lever arm.

8. In a clamping device for clamping a turnable cutter blade on a tool holder with a clamping jaw which has the construction of a two-arm lever, of which a front lever arm is supported on an upper side of said turnable cutter blade and presses same against a support surface on said tool holder and of which a rear lever arm is supported in a centering recess in said tool holder, said clamping jaw having a center part with means defining a hole extending therethrough, and a locking screw extending through said hole in said center part of said clamping jaw, said center part being located between said front and rear lever arms and is screwed into an internally threaded opening in said tool holder, the improvement comprising wherein said clamping jaw has on said center part a projection which is arranged coaxially with respect to the internally threaded opening, said projection having an opening therethrough for said locking screw, wherein a recess which is arranged coaxially with respect to said internally threaded opening is provided in said tool holder, into which recess is received said projection of said clamping jaw, wherein the exterior surface of said projection whose cross section at any point along its length is a circle, and wherein said clamping jaw is constructed as a swivel part having two lateral flattened edge portions which extend parallel to the longitudinal axis of front and rear lever arms and parallel to one another, and which flattened edge portions extend approximately tangentially with respect to said exterior surface of said projection.

9. The device according to claim 8, wherein said hole has in the center part of said clamping jaw on the upper side thereof an enlarged section for the complete reception of a screwhead on said locking screw therein.

10. The device according to claim 9, wherein the bottom wall of said enlarged section has a ball-cup-shape and the pressure surface of said screwhead, which surface faces said bottom wall, has the shape of a sphere.

11. The device according to claim 8, wherein said projection is tapered toward its free end and has a frustum of a cone shape and wherein the angle of the cone is approximately 10°.

12. The device according to claim 11, wherein said recess into which is received said projection is cylindrical and wherein the largest diameter of said projection corresponds approximately with the diameter of said cylindrical recess.

13. The device according to claim 8, wherein a cup spring is arranged in said recess between the bottom wall thereof and the free end of said projection.

14. The device according to claim 8, wherein a groove is provided in said tool holder for receiving said rear lever arm therein, the width of which groove corresponds with the width of said rear lever arm.

* * * * *